US006883340B2

United States Patent
Hirose et al.

(10) Patent No.: US 6,883,340 B2
(45) Date of Patent: Apr. 26, 2005

(54) VEHICLE AIR CONDITIONING CONTROL APPARATUS

(75) Inventors: Ryuichi Hirose, Tochigi (JP); Hiroyasu Nadamoto, Tatebayashi (JP); Kazuo Masuko, Sano (JP); Noriyuki Okawa, Sano (JP); Masaki Kawachi, Ashikaga (JP); Saburo Watanabe, Oyama (JP); Kaoru Sato, Kuki (JP); Takeshi Sekine, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/396,720

(22) Filed: Mar. 26, 2003

(65) Prior Publication Data

US 2004/0031277 A1 Feb. 19, 2004

(30) Foreign Application Priority Data

Mar. 27, 2002 (JP) ..................................... P2002-089118

(51) Int. Cl.⁷ ............................................... F25B 39/04
(52) U.S. Cl. ....................................... 62/183; 62/228.5
(58) Field of Search ............................... 62/183, 196.2, 62/228.5

(56) References Cited

U.S. PATENT DOCUMENTS 5,099,654 A * 3/1992 Baruschke et al. ........... 62/180
6,339,933 B2 * 1/2002 Hamery et al. ............... 62/133
6,367,271 B2 * 4/2002 Forrest et al. ................ 62/186
2001/0003904 A1 6/2001 Hamery et al.
2001/0047658 A1 12/2001 Forrest et al.

FOREIGN PATENT DOCUMENTS

EP    0 342 928 A2   11/1989
FR    2 811 617 A1    1/2002

OTHER PUBLICATIONS

Patent Abstract of Japan, vol. 018, No. 503, Sep. 21, 1994, JP 06–171352, Jun. 21, 1994.

* cited by examiner

Primary Examiner—William E. Tapolcai
(74) Attorney, Agent, or Firm—Foley & Lardner LLP

(57) ABSTRACT

A vehicle air conditioning control apparatus having an externally controlled type compressor 3 and an externally controlled type cooling electric fan 9 is disclosed in which a control map, for determining a duty ratio for a fan motor 10 in terms of a compressor discharge pressure Pd, is determined based on the maximum efficiency point, for providing the maximum fuel consumption, that allows a total engine load torque, represented by a total sum of an engine load torque caused by the externally controlled type compressor 3 and an engine load torque caused by a fan motor 10, to be a minimum torque, and a duty voltage to be applied to the fan motor 10 is controlled using the compressor outlet pressure Pd and the control map which is determined.

7 Claims, 8 Drawing Sheets

VEHICLE AIR CONDITIONING CONTROL APPARATUS

BACKGROUND OF THE INVENTION

1. Field of the Invention

The present invention relates to a vehicle air conditioning control apparatus having an air conditioning cycle which uses an externally controlled type cooling electric fan.

2. Description of the Related Art

An exemplary vehicle air conditioning control apparatus includes a control device disclosed in, for instance, Japanese Patent Provisional Publication No. 2000-274243.

The control device disclosed in this publication has a purpose of decreasing an operative duration of a cooling fan to an irreducible minimum of a demand over an entire region of an operating range such that, during a turned ON condition of an air conditioning cycle, a cooling electric fan disposed at a rear side of a condenser and a radiator is controlled by selecting a control constant from a cooling fan operation map as a parameter of a vehicle speed, an engine coolant water temperature and a compressor discharge pressure.

SUMMARY OF THE INVENTION

However, since a related art vehicle air conditioning control apparatus has the cooling fan operation map, available for use in cooling fan control, that is determined as a parameter referring simply to the vehicle speed, the engine coolant water temperature and the compressor discharge pressure, an issue arises in that it is hard to expect an improvement in a sufficient fuel consumption even when executing the cooling fan control using the cooling fan operation control map determined in such a way.

Accordingly, as described in an object of the related art technology, in a case where the cooling fan is operated at the irreducible minimum of demand over the entire area of the operating range, limiting of an alternator power load is accompanied by an in crease in a compressor power load. As a result, for instance, during a cool-down mode where a high cooling capacity is demanded, there occurs a tendency of an increase in a total engine load represented by a total sum of the compressor power load and the alternator power load. Since the fuel consumption depends on the total engine load, the fuel consumption becomes deteriorated in such a case.

The present invention has been completed in view of the above issue and has an object to provide a vehicle air conditioning apparatus that is able to improve a fuel consumption through an optimum fan motor control in consideration of a total engine load resulting from a compressor and a cooling electric fan.

In order to achieve the above object, according to an aspect of the present invention, there is provided a vehicle air conditioning apparatus for controlling an air conditioning cycle having a compressor, a fan motor activated by a power source composed of an alternator driven by an engine, and a fan driven by the fan motor for cooling a condenser, the apparatus comprising compressor-volume equivalent-value detecting means detecting a compressor-volume equivalent-value corresponding to a volume of the compressor, control map setting means setting a control map, that determines a fan motor load for the compressor volume detected by the compressor-volume equivalent-value detecting means, in a way to minimize a total engine load torque formed by a total sum of an engine load torque caused by the compressor and the engine load torque caused by the fan motor, and fan motor control means controlling the fan motor load, that forms a load of the fan motor, in dependence on the compressor-volume equivalent-value using the compressor-volume equivalent-value and the control map set by the control map setting means.

DESCRIPTION OF PREFERRED EMBODIMENT

An embodiment of this invention will be described below with reference to the accompanying drawings.

Figure 1:
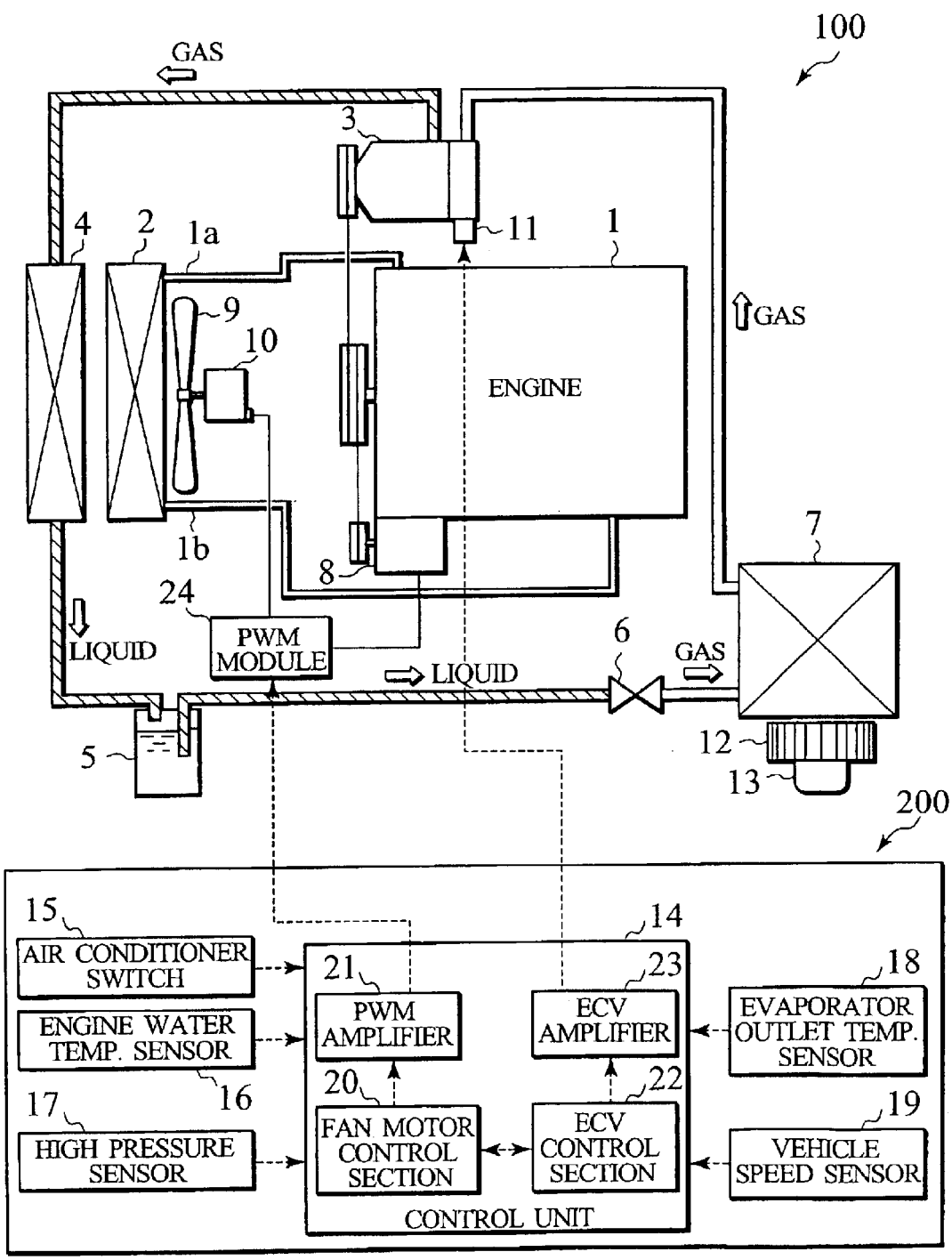
FIG. 1 is an overall system view of a vehicle air conditioning control apparatus according to an embodiment of the present invention.

FIG. 1 is an overall system view illustrating a vehicle air conditioning control apparatus 100 of one embodiment according to the present invention. The system shown in FIG. 1 is roughly comprised of an engine 1, a radiator 2, an externally controlled type compressor (compressor) 3, a condenser 4, a liquid tank 5, a temperature type auto-expansion valve 6, an evaporator 7, an alternator 8, a cooling electric fan 9, a fan motor 10, a control valve 11, a blower fan 12 and a blower fan motor 13.

The engine 1 and the radiator 2 are connected to one another through an engine coolant water inlet conduit 1a and an engine coolant water outlet conduit 1b.

An air conditioning cycle in a control unit of the presently filed embodiment is executed by the externally controlled type compressor 3 and the condenser 4, the liquid tank 5 and the temperature type auto-expansion valve 6, and the evaporator 7.

The externally controlled type compressor 3 is driven by the engine 1 to deliver refrigerant, delivered from the evaporator 7 in a gas phase at a low temperature and fixed pressure, to the condenser 4 in the gas phase at a high pressure and high temperature. The externally controlled type compressor 3 is controlled by an electronic control system 200 such that a compressor volume is variably controlled responsive to a duty signal to be applied to the control valve 11 which is internally contained. Also, a detail of the externally controlled type compressor 3 and the electronic control system 200 are will be described later.

The condenser 4 is located in front of the radiator 2 and cools refrigerant, prevailing at the high pressure and high temperature, to a condensing point by traveling wind or wind obtained by the cooling electric fan 9, thereby forming liquid of refrigerant at high pressure and medium temperature to be delivered to the liquid tank 5.

The liquid tank 5 removes moisture and dusts contained in refrigerant delivered from the condenser 4 in the liquid phase at the high pressure and medium temperature and accumulates refrigerant therein so as to allow refrigerant to be smoothly circulated for delivery to the temperature type auto-expansion valve 6.

The temperature type auto-expansion valve 6 serves to rapidly expand refrigerant delivered from the liquid tank 5 in the liquid phase at the high pressure and medium temperature to form liquid (in a mist form) at a low temperature and low pressure which is then delivered to the evaporator 7.

The evaporator 7 converts refrigerant, delivered from the temperature type auto-expansion valve 6 in the mist form, to provide gas at the low pressure and low temperature upon evaporation of the mist-like refrigerant by robbing heat from vehicle-inside air delivered from the blower fan 12, whereupon refrigerant in the gas phase at the low pressure and low temperature is delivered to the externally controlled type compressor 3.

The cooling electric fan 9 is driven by the fan motor 10 which is operated by a terminal voltage of the alternator 8 driven by the engine 1. The fan motor 10 is applied with a motor drive voltage which is controlled in a PWM mode to variably control a condenser cooling capacity provided by actuation of the fan motor 10.

Also, PWM (=Pulse Width Modulation) is meant by a pulse width modulation system to cause an amplitude and repetitive frequency in a fixed pulse time duration to vary in dependence on a waveform of a signal wave.

The blower fan 12 is driven by the blower fan motor 13 to draw an air stream (an inner air stream) from a vehicle compartment and compress the air stream to be blown out, for thereby feeding a cold air stream to the vehicle compartment.

The electronic control system 200 is described below. The electronic control system 200 shown in FIG. 1 is comprised of a control unit 14, an air conditioner switch 15, an engine coolant temperature sensor 16, a high pressure sensor (a compressor-volume-equivalent-value detection means) 17, an evaporator-outlet temperature sensor (an evaporator-outlet temperature detection means) 18, a PWM amplifier 21, an ECV control section (a compressor control means) 22, an ECV amplifier 23 and a PWM module 24. In the embodiment, a pressure of the compressor 3 is detected in order to obtain the volume of the compressor 3, it may be altered such that the volume of the compressor 3 is calculated from other measured values.

A switch signal of the air conditioner switch 15, engine coolant temperature information detected by the engine coolant water temperature sensor 16, a compressor-volume information detected by the high pressure sensor 17 disposed in a midway of an outlet conduit of the liquid tank 5, evaporator-outlet temperature information detected by the evaporator-outlet temperature sensor 18, and vehicle speed information detected by the vehicle speed sensor 19 are transmitted to the control unit 14.

The evaporator-outlet temperature sensor 18 is located in the outlet conduit at a position just downstream the evaporator 7. A detected value resulting from the high pressure sensor 17 is used as a value representative of a compressor outlet pressure Pd to control the fan motor 10. Additionally, temperature regulating dial information, interior air sensor information, outer air sensor information, solar radiation sensor information, suction temperature sensor information and mode switch information are transmitted to the control unit 14.

The control unit 14 is comprised of a fan motor control section 20 adapted to calculate a duty ratio of an output signal to be outputted to the fan motor 10, a PWM amplifier for outputting a duty signal to the PWM module 24 in response to a calculated result in the fan motor control section 20, an ECV control section 22 for calculating a duty ratio of an output signal to be outputted to the control valve 11, and an ECV amplifier 23 for outputting a duty signal to the control valve 11 in response to the calculated result of the ECV control section 22.

The PWM module 24 is connected to terminals of the alternator 8 and generates a drive voltage in a PWM duty ratio, in response to the duty signal delivered from the PWM amplifier 21, to be applied to the fan motor 10.

Figure 2:
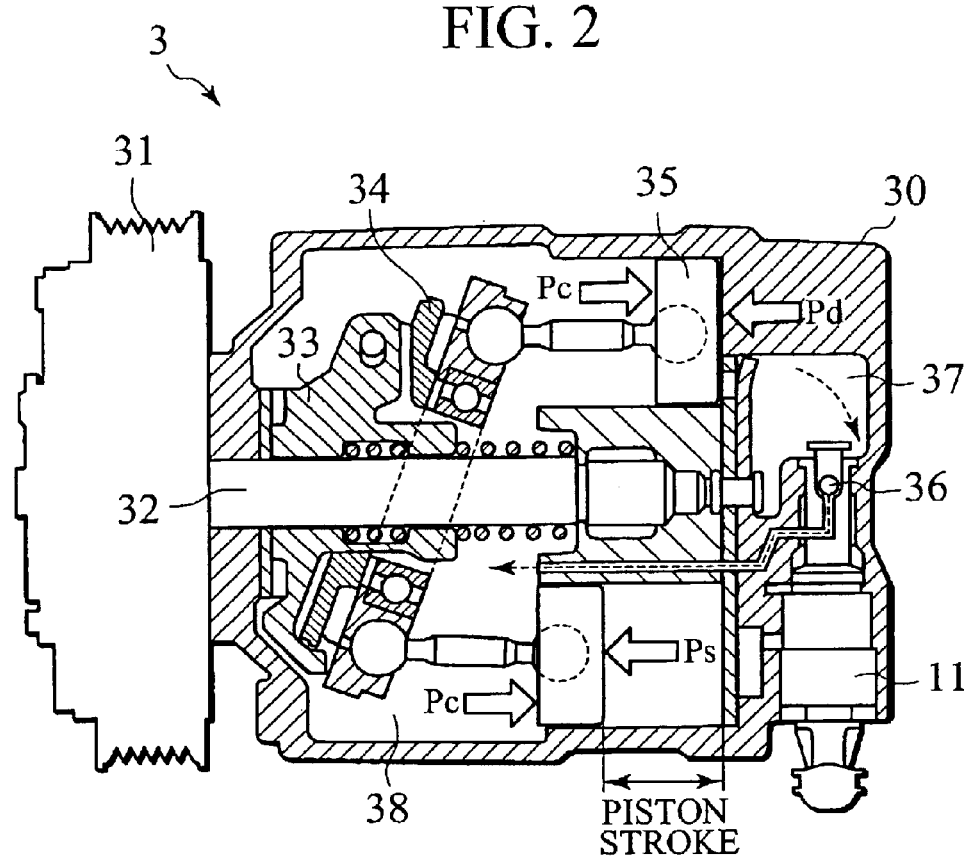
FIG. 2 is a cross sectional view of an externally controlled type compressor which is applied to the vehicle air conditioning control apparatus according to the embodiment of the present invention.
Figure 3:
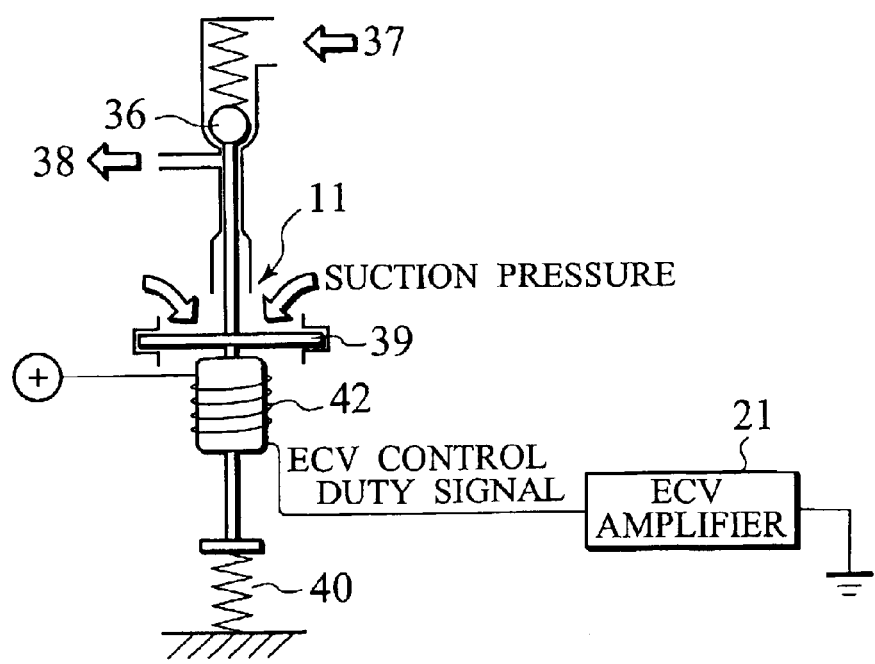
FIG. 3 is a view illustrating a variable volume control function of the externally controlled type compressor which is applied to the vehicle air conditioning control apparatus according to the embodiment of the present invention.

FIG. 2 is a cross sectional view illustrating the externally controlled type compressor 3, and FIG. 3 is a view illustrating a method of controlling the compressor volume (outlet pressure) of the compressor 3 by using the duty signal applied to the control valve 11 of the externally controlled type compressor 3.

The externally controlled type compressor 3 is of a multi-cylinder-swash-plate type and is comprised of a compressor case 30, a pulley 31, a drive shaft 32, a swash plate driving body 33, a swash plate 34, pistons 35, a high pressure ball valve 36, a control valve 11, a high pressure chamber 37 and a crank chamber 38.

The externally controlled type compressor 3 performs control of a discharge volume by varying an inclination of the internally contained swash plate 34. That is, upon receipt of the duty signal applied to the control valve 11 incorporated in the externally controlled type compressor 3, the amount of lift of the high pressure ball valve 36 is varied. This causes the flow rate of refrigerant, flowing from the high pressure sensor 37 (=outlet pressure Pd) into the crank chamber 38 through the high pressure ball valve 36, to be controlled, thereby varying the pressure (=crank chamber pressure Pc) in the crank chamber 38 of the compressor 3 to allow the inclination of the swash plate 34 to be varied.

As shown in FIG. 3, the amount of lift of the high pressure ball valve 36 is determined by a balance between a low pressure (=suction pressure Ps) to be imparted to a diaphragm 39 of the control valve 11 and a spring force of a set spring 40 and a magnetic force created in an electromagnetic coil 42.

An ON-OFF pulse signal (=duty signal) outputted from the ECV amplifier, for instance, 400 Hz, is applied to the electromagnetic coil 42 of the control valve 11. And variation in the magnetic force resulting from an effective current caused by the duty ratio allows the amount of lift of the high pressure ball valve 36 to be controlled.

[Fan Motor Control Operation]

Figure 4:
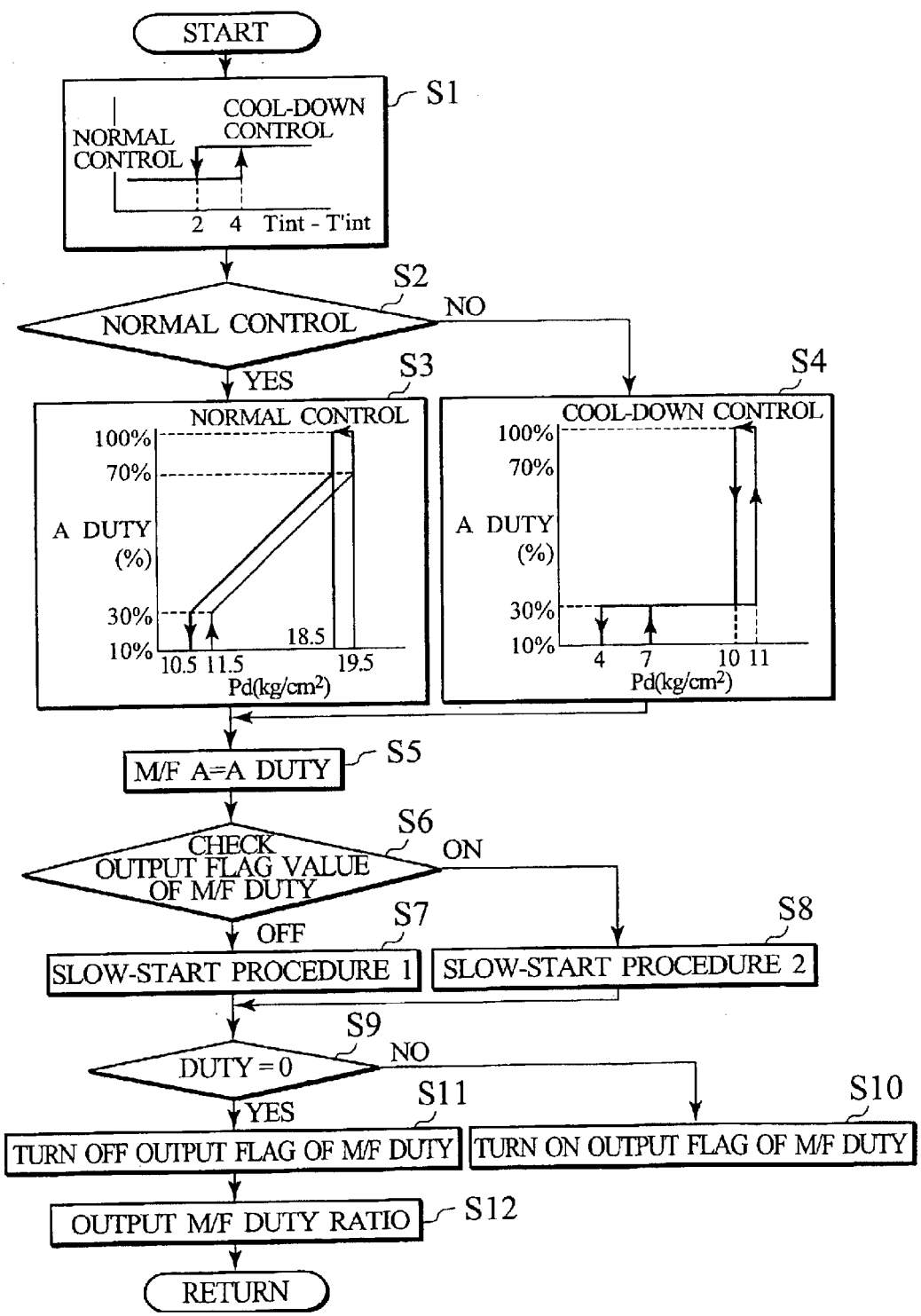
FIG. 4 is a flowchart illustrating flow of a fan motor control procedure to be executed in a fan motor control section of a control unit in the vehicle air conditioning control apparatus according to the embodiment of the present invention.

FIG. 4 is a flowchart illustrating the flow of fan motor control operation to be executed by the fan motor control section 20 of the control unit 14. Hereinafter, various steps are described.

In step S1, a differential temperature Δ T between an evaporator-outlet temperature Tint and a target evaporator-outlet temperature T'int (to serve as a vehicle status detecting means and a demanded cooling capacity predicting means) is calculated. And, in case of the calculated differential temperature Δ T is less than 4° C., the fan motor control section 20 is set in a normal control mode and, if the calculated differential temperature Δ T exceeds 4° C., then the fan motor control section 20 is changed over from the normal control mode to a cool-down control mode.

And, if the magnitude of the differential temperature Δ T, calculated during the cool-down control mode, decreases below the value of 2° C., then the fan motor control section 20 is changed over from the cool-down control mode to the normal control mode.

Here, in the ECV control section 22 (a target evaporator-outlet temperature setting means) of the control unit 14, operation is executed to perform compressor control to obtain a target compressor volume that is calculated in response to the atmospheric temperature, the vehicle compartment temperature and the target blow-out wind temperature. The target evaporator-outlet temperature T'int is obtained by the ECV control section 22 during the calculating operations. And, the target evaporator-outlet temperature is applied to the fan motor control section 20 from the ECV control section 22 via a two-way communication line.

In step S2, discrimination is made to see whether the normal control mode is set in step S1 and, in the presence of the normal control mode being set, flow is routed to step S3 whereas, if the cool-down control mode is set, flow is routed to step S4.

In step S3, the duty ratio of A DUTY to be applied to the fan motor 10 is calculated by using a normal control map and the compressor discharge pressure Pd described in a frame of FIG. 4.

Here, the normal control map is determined so as to proportionately vary the duty ratio of A DUTY in a range between 0% and 100% with a hysteresis in an increase and a decrease in a range of $10.5 \text{ kg/cm}^2 \leq Pd \leq 19.5 \text{ kg/cm}^2$ such that A DUTY=0% is assigned for a range of $Pd<10.5 \text{ kg/cm}^2$ and A DUTY=100% is assigned for a range of $Pd>19.5 \text{ kg/cm}^2$.

Further, a compressor discharge pressure recognition value, that is corrected so as to cause the pressure sensor value to vary on a gradual slope on the basis of the pressure sensor value of the high pressure sensor 17, is used as the compressor discharge pressure Pd. Also, the normal control map is set on the basis of a control line during a traveling mode shown in FIG. 6 which will be described below.

In step S4, the duty ratio of A DUTY to be applied to the fan motor 10 is calculated by using a cool-down control map and the compressor discharge pressure Pd described in a frame of FIG. 4.

Here, the cool-down control map is determined such that, in an increasing phase, A DUTY=0% is assigned for a range of $Pd<7.0 \text{ kg/cm}^2$, A DUTY=30% is assigned for a range of $7.0 \text{ kg/cm}^2 \leq Pd \leq 11.0 \text{ kg/cm}^2$ and A DUTY=100% is assigned for a range of $Pd>11.0 \text{ kg/cm}^2$. In a decreasing phase, A DUTY=100% is assigned for a range of $10.0 \text{ kg/cm}^2 < Pd \leq 11.0 \text{ kg/cm}^2$, A DUTY=30% is assigned for $4.0 \text{ kg/cm}^2 \leq Pd \leq 10.0 \text{ kg/cm}^2$ and A DUTY=0% is assigned for a range of $4.0 \text{ kg/cm}^2 > Pd$.

In step S5, the duty ratio of A DUTY for the control of the fan motor 10 calculated in the step S3 or the step S4 is allocated to the fan motor duty ratio of M/FA (i.e., M/FA=A DUTY), and flow is proceeds to step S6.

In step S6, operation is executed to check the M/F-DUTY OUTPUT FLAG indicative of whether the fan motor duty ratio of M/FA in operations up to step S5 is zero. That is, judgment is made to see an ON/OFF state in value of the M/F-DUTY OUTPUT FLAG and, in case of OFF state, flow proceeds to step S7 whereas, in case of the ON state, flow is routed to step S8.

In step S7, if the MIF-DUTY OUTPUT FLAG remains OFF, that is, during a zero start, slow-start operation 1 is executed to allow the duty ratio to vary at a rate of, for instance, 6.5%/sec.

In step S8, if the M/F-DUTY OUTPUT FLAG remains ON, that is, when the duty ratio is already added, slow-start operation 2 is executed to allow the duty ratio to vary at a rate of, for instance, 28%/sec.

In step S9, judgment is made to see whether the duty ratio related to the fan motor 10 is zero and, in case of the duty ration≠0, flow is routed to step S10 whereas, in case of the duty ratio=0, flow proceeds to step S11.

In step S10, the M/F-DUTY OUTPUT FLAG is turned ON and flow proceeds to step S12.

In step S10, the M/F-DUTY OUTPUT FLAG is turned OFF and flow proceeds to step S12.

In step S12, the fun duty signal finally determined by the fan duty signal of the step S5 and determined in the slow-start operation 1 and the slow-start operation 2, are outputted from the PWM amplifier 21 to the PWM module 24.

In this flowchart, flows in step S1→step S2→step S4→step S5 may correspond to a fan motor control means. Also, flows in step S6 to step S12 may correspond to a slow-start control means.

[Setting of Control Map]

A method of setting the control map set forth above.

In a case where the cooling electric fan 9 is adopted as the cooling fan of the condenser 4, the load torque to be exerted to the engine 1 (hereinafter referred to as a total engine load) is given by a total sum of a power load torque (hereinafter referred to as a compressor power load) for driving the compressor 3 and a power load torque (hereinafter referred to as a cooling-fan electrical load) for driving the alternator for the cooling electric fan 9. That is, it is expressed as (Total Engine Load)=(Compressor Power Load)+(Cooling-Fan Electrical Load).

Then, for the case where the externally controlled type compressor 3 and the externally controlled type cooling electric fan 9 are adopted in the air conditioning system, various experimental tests were conducted to study about the relationships among the compressor power load, the cooling-fan electrical load and the total engine load resulting from the total sum of both loads.

Figure 5:
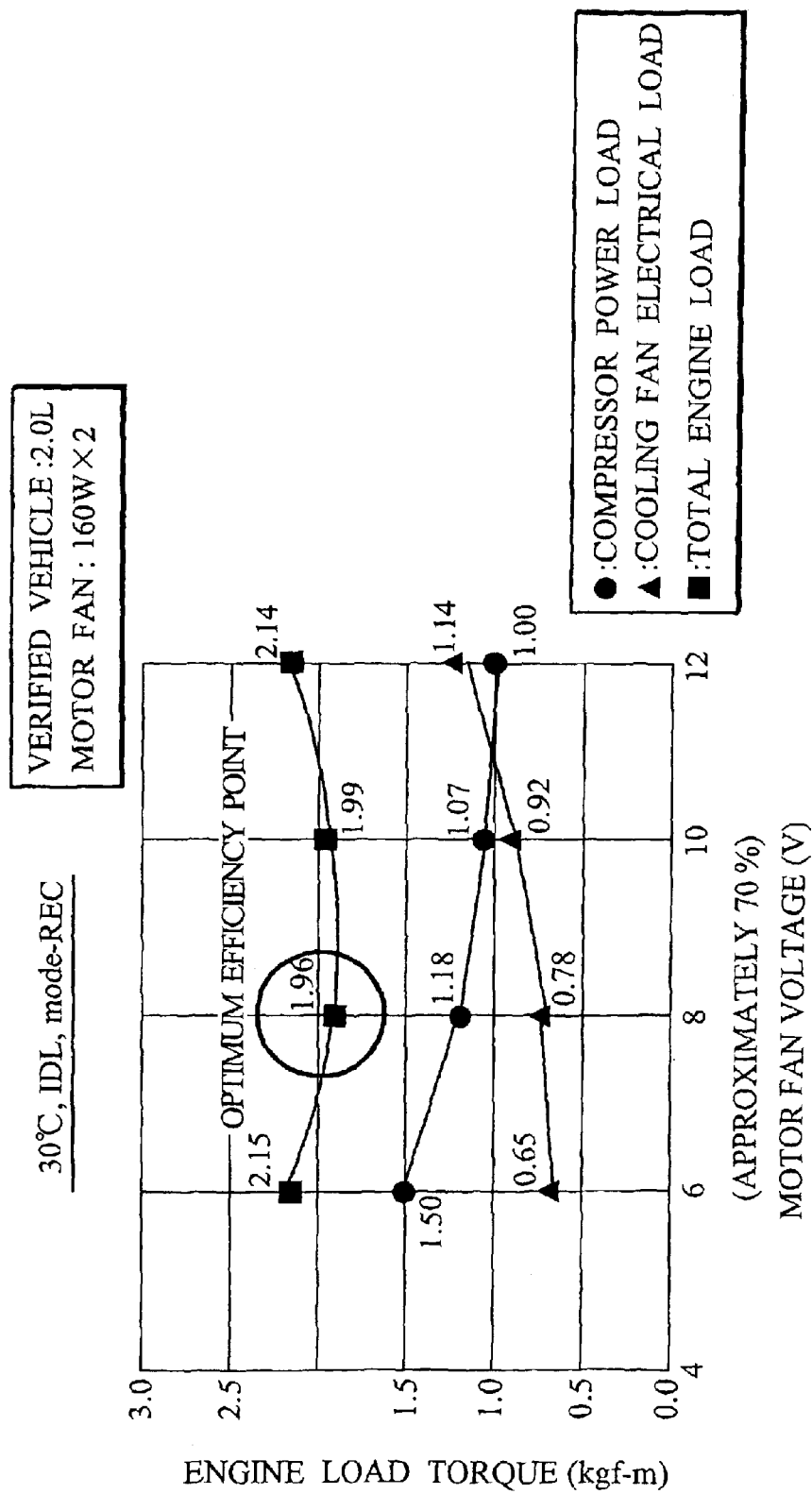
FIG. 5 is an experimental test result illustrating an engine load characteristic caused in an alternator, an engine load characteristic caused in a compressor and a total engine load torque characteristic indicative of a sum of both load torque when measured while keeping a cooling capacity.

FIG. 5 shows results of the experimental tests.

These tests were conducted to measure the engine load torque (cooling-fan electrical load) resulted by the alternator 8 under a condition with a cooling capacity remaining at a fixed rate, and the engine load torque (compressor power load) resulted by the compressor 3.

As FIG. 5 indicates, there is a relationship in that, as the power load resulted by the compressor 3 increases, the cooling-fan electrical load of the alternator 8 decreases and, in contrast, if the cooling-fan electrical load of the alternator 8 increases, the compressor power load resulted by the compressor 3 decreases.

According to the experimental test results shown in FIG. 5, the total engine load torque varied in patterns, such as, the total engine load torque=2.5 kg f-m when motor fan voltage was 6 volts, the total engine load torque=1.96 kg f-m when motor fan voltage was 8 volts, the total engine load torque= 1.99 kg f-m when motor fan voltage was 10 volts and the total engine load torque=2.14 kg f-m when motor fan voltage was 12 volts. Accordingly, it appears that the maximum efficiency point, wherein the total engine load torque takes the minimum value, results when the motor fan voltage is at 8 volts.

The experimental tests of FIG. 5 results that there is the relationship wherein increasing the compressor power load causes the cooling-fan electrical load to decrease whereas, on the contrary, increasing the cooling-fan electrical load causes the compressor power load to decrease and, further, that limiting one of the cooling-fan electrical load and the compressor power load to a lower value does not necessarily cause a decrease in the total engine load.

This experimental result reveals that a cooperative relationship exists between the compressor power load and the cooling-fan electrical load in that controlling the electrical load of the fan motor 10 causes the power load of the compressor 3 to vary. Also, this means that, by optimizing the cooling-fan electrical load, the compressor 3 and the fan motor 10 can be operated at the maximum efficient point where the total engine load torque takes the minimum value.

Next, test was conducted to measure the maximum efficiency points (=the maximum fuel consumption points) at various traveling speeds while varying the PWM duty ratio of the fan motor 10 and the compressor discharge pressure Pd at the traveling speeds of 40 km/h, 60 km/h and 80 km/h, respectively.

Figure 6:
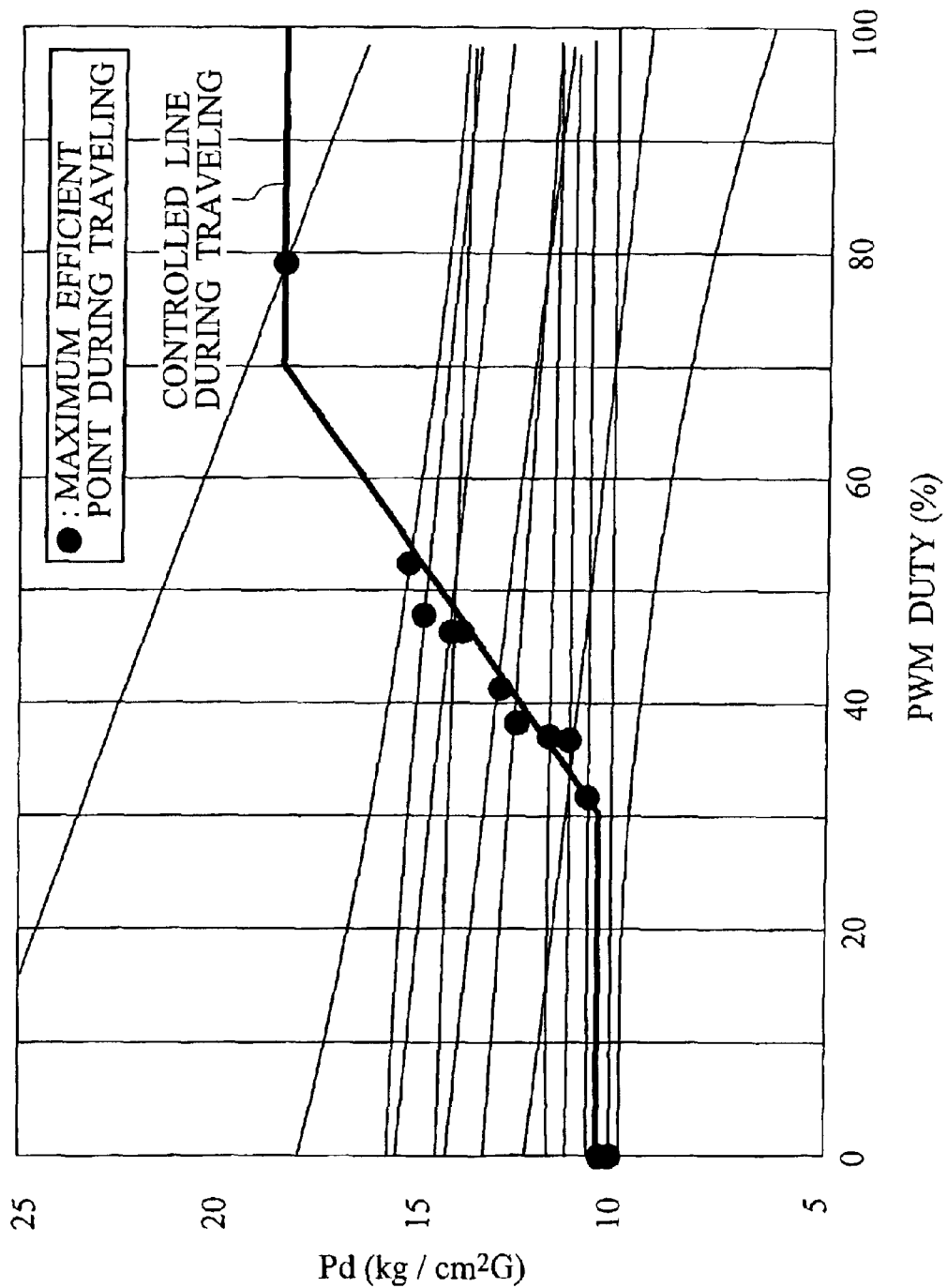
FIG. 6 is a view illustrating a control line for a traveling mode with a compressor outlet discharge pressure being plotted on an axis of ordinates while a PWM duty for a fan motor is plotted on an abscissa axis.

As shown in FIG. 6, an inclination of the control line during the traveling mode and an optimum control line for the traveling mode were determined in view of the maximum efficient points obtained in measurements set forth above and the cooling capacity of the air conditioning system.

Then, the normal control map shown in the frame of step S5 in FIG. 4 was determined on the basis of the control line in the traveling mode shown in FIG. 6. In addition, on the basis of consideration in that the PWM duty ratio for the fan motor 10 is assigned to be 100% at the discharge pressure Pd lower than the compressor discharge pressure Pd in the normal control map, the cool-down control map shown in a frame of step S6 in FIG. 4 was determined (to form a control map setting means).

[Fan Motor Control Action At Departure]

Upon startup of the engine 1 and under a halt of a vehicle before a departure thereof, if the air conditioner switch 15 is turned on, the evaporator-outlet temperature Tint is high and, hence, the differential temperature Δ T between the evaporator-outlet temperature Tint and the target evaporator-outlet temperature T'int exceeds a value of 4° C. When this takes place, in the flowchart shown in FIG. 4, flow proceeds in step S1→step S2→step S4→step S5 to allow the cool-down control map, prepared in a manner set forth above, to be selected for thereby beginning the cool-down control in accordance with the cool-down control map.

Figure 7:
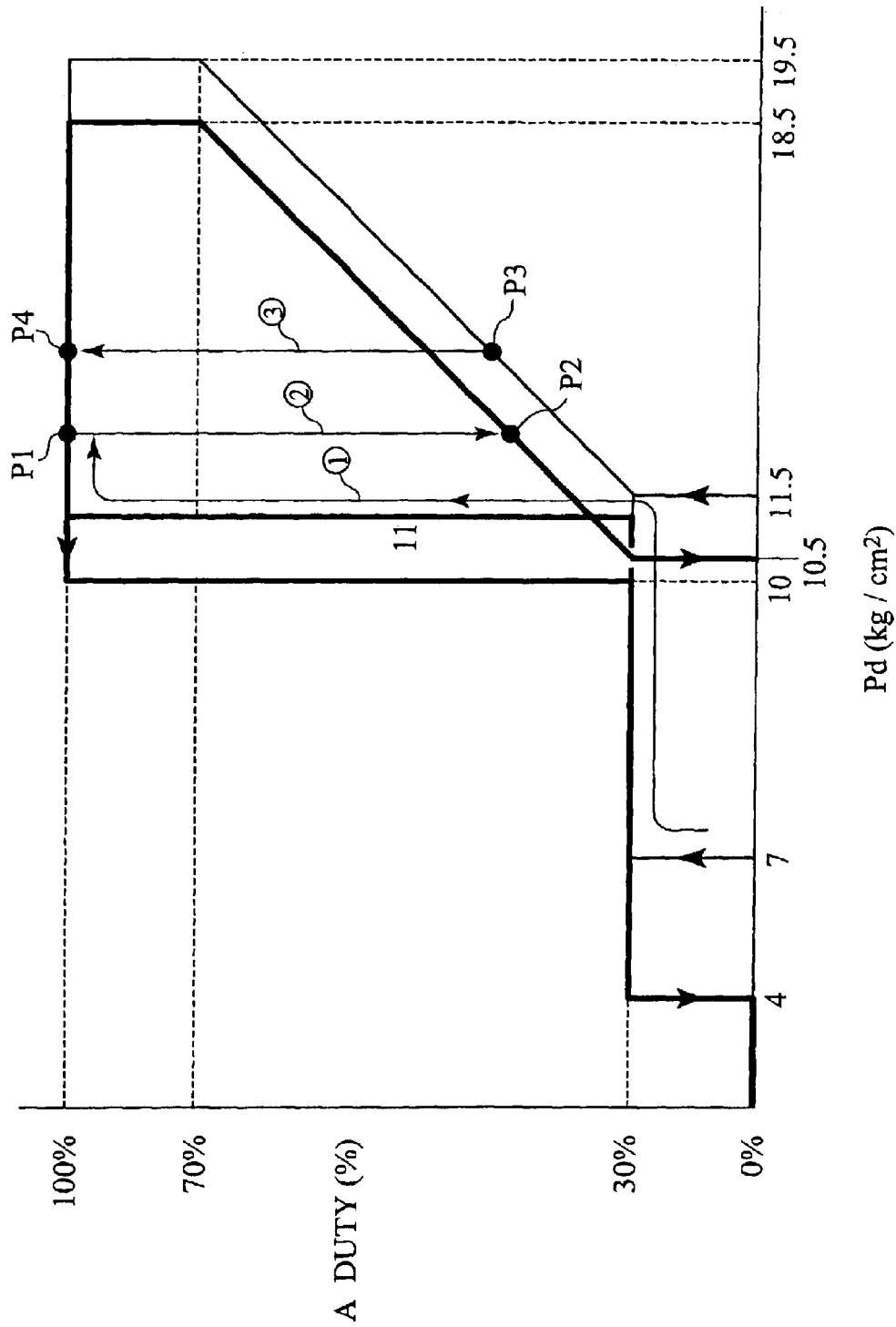
FIG. 7 is a view representing a normal control map and a cool-down control map plotted on the same coordinate axis for the purpose of describing operations of the control unit in various vehicle statuses.

That is, as shown by a flow ① in FIG. 7, if the discharge pressure Pd of the compressor 3 reaches a value of 7.0 kg/cm², the duty ratio for the fan motor 10 is increased to a level of 30% which is maintained until the compressor discharge pressure Pd reaches the value of 11.0 kg/cm², and when the compressor discharge pressure Pd reaches the value of 11.0 kg/cm², the duty ratio for the fan motor 10 is increased to a value of 100% whereupon this duty ratio of 100 5 is maintained.

In such a way, during the cool-down mode at the start of the operation of air conditioning, as the compressor discharge pressure Pd reaches the low value (=7.0 kg/cm²), the operation of the fan motor 10 is initiated and, if the compressor discharge pressure Pd reaches a normal initiating range (=11.0 kg/cm²), the duty ratio for the fan motor 10 is selected to be 100% to permit the fan-motor electrical load in an early stage for thereby restraining an increase in the compressor power load, resulting in a remarkable improvement in a fuel consumption.

As clearly understood from the experimental tests described above, during the cool-down mode when initiating the air conditioning, if the fan motor 10 is tentatively actuated in a reduced load, although the fan-motor electrical load decreases, the compressor power load increases due to a cooperative action with a difficulty in expecting a reduced fuel consumption. Additionally, unlike the traveling stage described later, during the departure stage, cooling of the condenser 4 due to a traveling wind can not be expected and, in order to ensure a demanded cooling capacity, a wind from the cooling electric fan 9 is needed.

[Fan Motor Control Action During Traveling]

During traveling of the vehicle, the evaporator-outlet temperature Tint is decreased due to a cooling effect and, if the differential temperature Δ T decreases below 2° C., in the flowchart of FIG. 4, flow is routed in step S1→step S2→step S3→step S5 whereby the cool-down control is released while the normal control map is selected to commence the normal control.

That is, as shown by flow ② in FIG. 7, suppose that the operating point, at which the differential temperature Δ T decreases below the value of 2° C., is P1, the duty ratio for the fan motor 10 is caused to drop to an operating point P2 at a breath and, thereafter, operation is executed to control for varying the duty ratio for the fan motor 10 along the normal control map in dependence on a decrease or an increase in the compressor discharge pressure Pd of the compressor 3.

During the traveling mode, cooling of the condenser 4 due to the traveling wind is expected and, hence, even if the fan-motor electrical load is limited, it is possible to obtain the demanded cooling capacity. Further, by limiting the fan-motor electrical load, the total engine load can be maintained at a low range due to fan-motor control depending on the normal control map. As a consequence, an improvement in fuel consumption can be achieved in accordance with the normal control map.

[Cool-Down Control Action During Traveling]

For instance, description is made hereinafter in connection with a case where, in a midway during the traveling mode, a window is opened to allow atmospheric air to flow in a vehicle compartment to cause the evaporator-outlet temperature Tint to increase or a case where, during the traveling mode, a temperature adjusting dial is operated to cause the setting temperature to be considerably lowered.

In such a case, if the differential temperature between the evaporator-outlet temperature Tint and the target evaporator-outlet temperature T'int exceeds 4° C., in the flowchart of FIG. 4, flow is routed in step S1→step S2→step S4→step S5 whereby the cool-down control is selected to initiate the cool-down control.

That is, as shown by flow ③ in FIG. 7, suppose that the operating point, at which a shift occurs from the normal control to the cool-down control, is P3, the duty ratio for the fan motor 10 is caused to drop to an operating point P4 at a breath to allow the duty ratio for the fan motor 10 to assume 100%. Thereafter, operation is executed to control the duty ratio for the fan motor 10 to lie in the value of 100% along the cool-down control map even in the presence of an increase in the compressor discharge pressure Pd accompanied by an increase in the demanded cooling capacity.

As set forth above, during the cool-down control mode during the traveling, the duty ratio for the fan motor is increased to the value of 100% at the breath to alter such that the fan-motor electrical load assumes the maximum value in a high response, whereby an increased condenser cooling capacity is achieved both by the cooling electric fan 9 and the traveling wind. Consequently, the presence of an ability of limiting an increase in the compressor discharge pressure accompanied by an increased condenser cooling capacity enables the fuel consumption to be improved in accordance with the cool-down control map.

[Fuel Consumption Comparison]

Next, comparison tests for fuel consumption was conducted using an air conditioning system A having a fixed volume compressor interlocked with ON/OFF operation of the air conditioner and an air conditioning system B of the embodiment wherein composite control (cooperative control in consideration of fuel consumption) is implemented for the externally controlled type fan motor 10 relative to the externally controlled type variable volume compressor 3.

Figure 8:
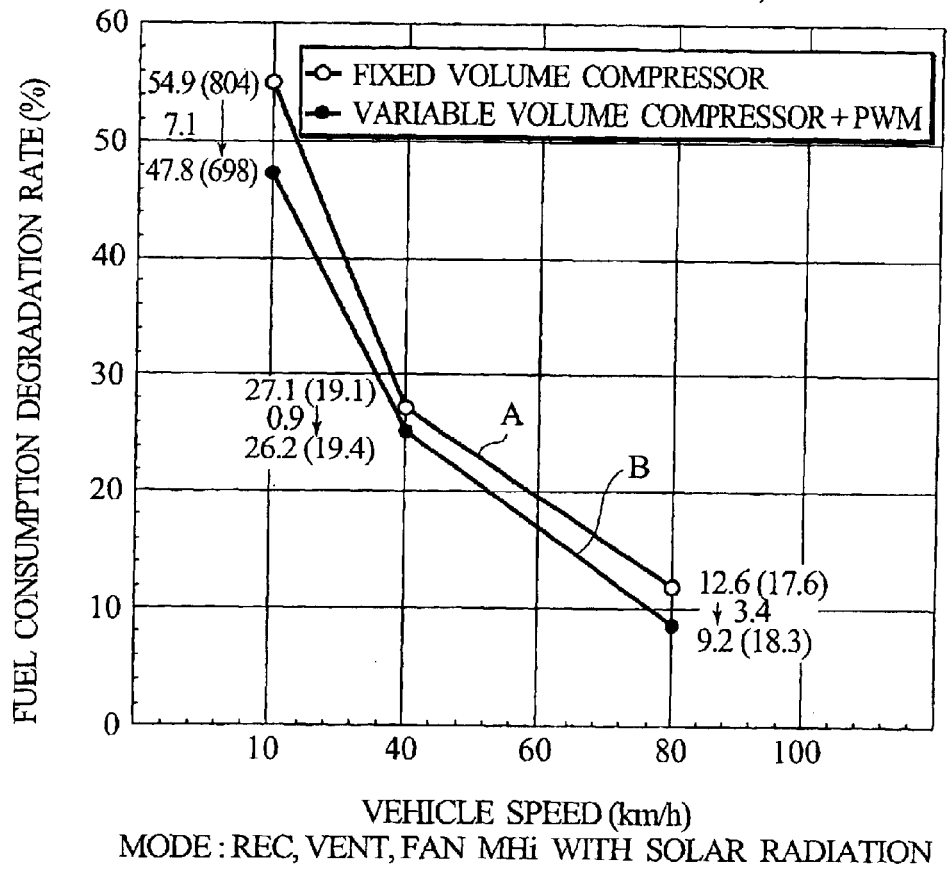
FIG. 8 is a view showing a result of a fuel consumption comparison test 1 conducted for confirming an improved fuel consumption effect obtained by a fan motor control according to the present invention.

In the fuel consumption comparison test results conducted at 30° C. with 50% in humidity, during an idling mode at an engine speed of 900 rpm, a mode A provides a fuel consumption degradation rate of 54.9% and a mode B provides the fuel consumption degradation rate of 47.8%, resulting in a 7.1% drop from A to B. During the traveling mode at the vehicle speed of 40 km/h, the mode A provides the fuel consumption degradation rate of 27.1% and the mode B provides the fuel consumption degradation rate of 26.2%, resulting in a 0.9% drop from A to B. During the traveling mode at the vehicle speed of 80 km/h, the mode A provides the fuel consumption degradation rate of 12.6% and the mode B provides the fuel consumption degradation rate of 9.2%, resulting in a 3.4% drop from A to B. In FIG. 8, the fuel consumption degradation rate was calculated in a formula expressed by Fuel Consumption degradation rate= (Fuel Consumption in Air Conditioning being Turned OFF− Fuel Consumption in Air Conditioning being Turned ON)÷ (Fuel Consumption in Air Conditioning being Turned OFF).

Figure 9:
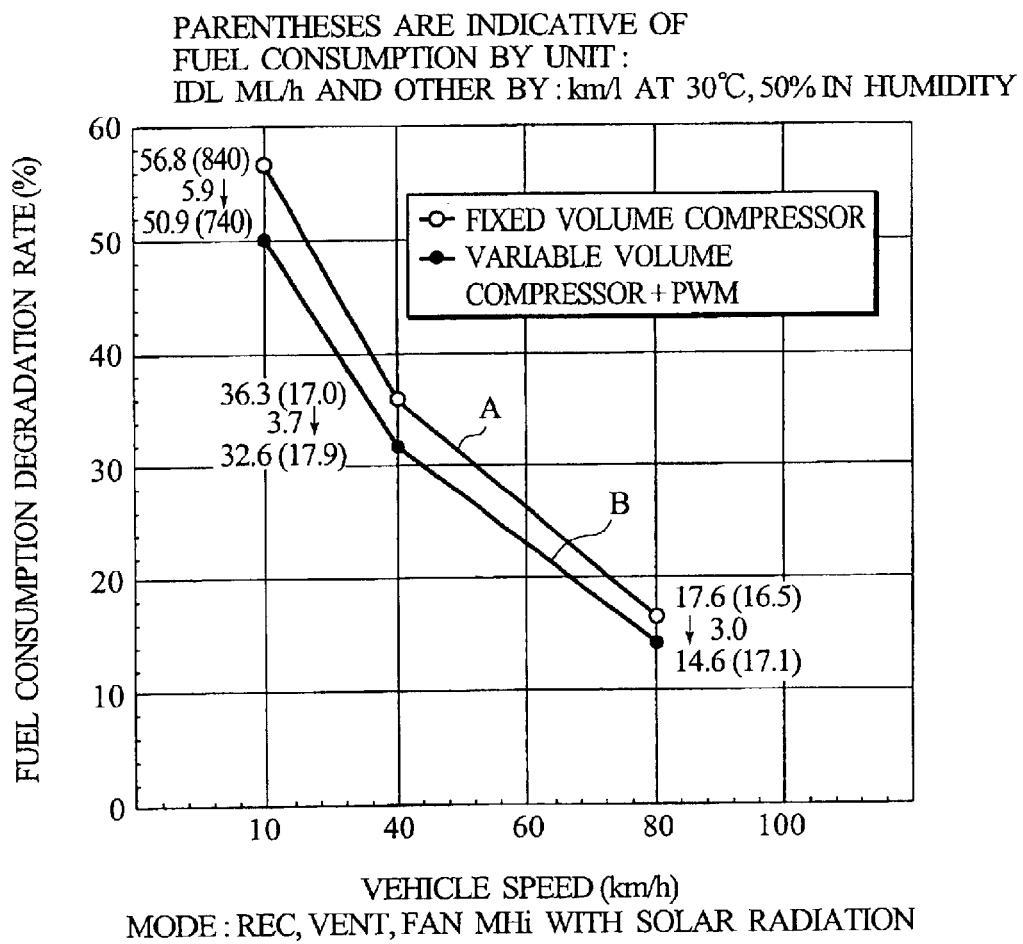
FIG. 9 is a view showing a result of a fuel consumption comparison test 2 conducted for confirming the improved fuel consumption effect obtained by the fan motor control according to the present invention.

In the fuel consumption comparison test results conducted at 35° C. with 50% in humidity, during the idling mode at an engine speed of 900 rpm, a mode A provides a fuel consumption degradation rate of 56.8% and a mode B provides the fuel consumption degradation rate of 50.9%, resulting in a 5.9% drop from A to B. During the traveling mode at the vehicle speed of 40 km/h, the mode A provides the fuel consumption degradation rate of 36.3% and the mode B provides the fuel consumption degradation rate of 32.6%, resulting in a 3.7% drop from A to B. During the traveling mode at the vehicle speed of 80 km/h, the mode A provides the fuel consumption degradation rate of 17.6% and the mode B provides the fuel consumption degradation rate of 14.6%, resulting in a 3.0% drop from A to B. Also, in FIG. 9, the fuel consumption degradation rate was calculated in a formula expressed by Fuel Consumption Degradation Rate= (Fuel Consumption in Air Conditioning being Turned OFF− Fuel Consumption in Air Conditioning being Turned ON)÷ (Fuel Consumption in Air Conditioning being Turned OFF).

From the foregoing description, advantageous improving effects in fuel consumption provided when compared between the air conditioning system B of the embodiment and the related art air conditioning system A are listed below.

(a) During idling, the fuel consumption degradation rates were 7.1% and 5.9% the modes A and B, respectively, and it was confirmed that the fuel consumption was improved even by approximately 6%.

(b) During traveling at a speed of 40 km/h, the fuel consumption degradation rates were 0.9% and 3.7% the modes A and B, respectively, and it was confirmed that the fuel consumption was improved even in a range between 1% and 4%.

(c) During traveling at a speed of 80 km/h, the fuel consumption degradation rates were 3.4% and 3.0% the modes A and B, respectively, and it was confirmed that the fuel consumption was improved even by approximately 3%.

The vehicle air conditioning apparatus of the embodiment has features described below.

(1) The control map, by which the duty ratio for the fan motor 10 is determined in response to the compressor discharge pressure Pd, is set on the basis of the maximum efficiency point, that permit the total engine load torque, indicative of the total sum of the engine load torque resulted by the externally controlled type compressor 3 and the engine load torque, to be decreased to the minimum torque to provide the maximum fuel consumption, and by using the compressor discharge pressure Pd and the control map which is settled, the duty voltage to be applied to the fan motor 10 is controlled. For this reason, an optimum fan motor control can be performed taking the total engine load caused by the externally controlled type compressor 3 and the cooling electric fan 9 into consideration, thereby achieving a remarkable improvement in fuel consumption.

(2) During the cool-down mode, the respective maximum efficiency points depending on the vehicle statuses such as idling and normal traveling modes are preliminarily measured, and the control map, by which the duty ratio for the fan motor 10 responsive to the compressor discharge pressure Pd, is determined on the basis of measured results of the maximum efficiency points. For this reason, it is possible to achieve a highly improved fuel consumption regardless of the vehicle statuses.

(3) In step S1 in FIG. 4, if it is discriminated that the magnitude of the differential temperature Δ between the evaporator-outlet temperature Tint and the target evaporator-outlet temperature T'int exceeds a value of 4° C., operation is executed in flow of step S1→step S2→step S6→step S7 to perform the fan motor control using the cool-down control map determined on the basis of the maximum efficiency point at which the maximum fuel consumption is obtained under the cool-down situation. For this reason, during the cool-down mode, it is possible to achieve a highly improved fuel consumption while ensuring a demanded cooling capacity.

(4) The evaporator-outlet temperature sensor 18 detecting the evaporator-outlet temperature Tint at the position immediately after the outlet of the evaporator 7, and the ECV control section 22, that allows the target evaporator-outlet temperature T'int at the position just after the outlet of the evaporator 7, are provided, thereby enabling the demanded cooling capacity to be predicted in dependence on the magnitude of the differential temperature Δ between the evaporator-outlet temperature Tint and the target evaporator-outlet temperature T'int. For this reason, by merely detecting the evaporator-outlet temperature Tint, the target evaporator-outlet temperature T'int calculated in the ECV control section 22 is utilized and the magnitude of the demanded cooling capacity (=the magnitude of the differential temperature Δ) can be easily predicted at a high precision.

(5) The externally controlled type compressor 3, whose compressor volume is variably controlled from outside, is used as the compressor of the air conditioning system, and the externally controlled type compressor 3 is arranged such that control is performed by the ECV control section 22 to obtain the target compressor volume effective for achieving power saving in terms of a cooling capacity demanded for a particular air conditioning cycle. For this reason, optimization (for the power saving and the fuel consumption) in the compressor discharge pressure Pd can be achieved regardless the vehicle statuses, and the variable volume control of the externally controlled type compressor 3 is used with the PWM control of the fan motor 10, thereby enabling control of improvement in fuel consumption, that allows the total engine load resulting from the total sum of the compressor power load and the fan motor electric load to be minimized, at a high efficiency.

(6) In step S6, when discrimination is made that, in operations up to step S5, the fan motor duty ratio M/FA is not zero, flow proceeds to step S8 to execute the slow-start operation 2 to allow the amount of variation in the duty ratio to be limited (to a value of, for example, 28%/sec). For this reason, for instance, when varying the fan motor duty ratio M/FA, commanded when shifted from the normal control mode to the cool-down control mode, at a breath, it is possible to prevent the fuel consumption from being deteriorated due to rapid change in load of the fan motor 10.

That is, if the fan motor duty ratio M/FA is rapidly increased during the normal condition of the engine 1, a remarkable torque variation occurs and, therefore, the engine rotational speed must be increased in order to resist such a torque variation, inviting deterioration in fuel consumption.

(7) In step S6, when discrimination is made that, in operations up to step S5, the fan motor duty ratio of M/FA is zero, flow proceeds to step S7 to execute the slow-start operation 1 to allow the duty ratio to vary along the first inclination (to a value of, for example, 6.5%/sec) at a limited rate, and when discrimination is made that the fan motor duty ratio M/FA appearing up to the preceding operation is not zero, flow proceeds to step S8 to execute the slow-start operation 2 to allow the duty ratio to vary along the second inclination (to a value of, for example, 28%/sec) at a limited rate. For this reason, it is possible to accomplish a compatibility between the operation of the fan motor 10, based on a smooth rotational increase at the zero-start stage, and avoidance in deterioration of the fuel consumption caused by rapid change in load of the fan motor in a stage except for the zero-start.

As set forth above, while the vehicle air conditioning apparatus of invention has been described in conjunction with the presently filed embodiment, a detailed structure of the present invention is not limited to the embodiment and design changes or additions may be allowed without departing from the spirit and scope of the invention as defined in appended claims.

In particular, while the embodiment has been described with reference to an example where the demanded cooling capacity predicting means is provided as the vehicle statuses detecting means to define the vehicle statuses being classified in the cool-down mode and the normal traveling mode, it may be altered to allow the vehicle statuses to be finely divided in small vehicle ranges between a zero-vehicle speed and the maximum vehicle speed. Also, the vehicle statuses may be classified in terms of a value of the engine rotational speed or a positive or negative value of an absolute value of the engine-rotational-speed varying rate. In addition, the vehicle statuses may be classified in terms of a value of an accelerator opening degree (throttle-opening degree) or a positive or negative value of an absolute value of an accelerator-opening-degree varying rate. Thus, a method of detecting the vehicle statuses by which the engine load is influenced and classifying the vehicle statuses in dependence on the degree of influence to be exerted to the engine load may be included in the present invention.

While the embodiment has been described in connection with an example where the externally controlled type compressor is used as the compressor, the present invention may also be applied to a fixed volume type compressor that is controlled to turn ON/OFF depending on the status of the air conditioner remaining in an operative or inoperative state. Also, the present invention may be applied to a variable volume type electrically powered compressor (that forms, in this case, an electrical load like the cooling electric fan) driven by a motor.

While the embodiment has been described in connection with an example where the PWM control is infinitely executed in the fan motor of the cooling electric fan, the present invention may also be applied to the fan motor of the type which is controlled in ON/OFF modes (variable in two stages).

While the embodiment has been described in connection with an example where the demanded cooling capacity predicting means predicts in dependence on the differential temperature between an actual value of the evaporator-outlet temperature and the target value, for instance, a demanded cooling capacity may be predicted responsive to rapid increase in the temperature of the vehicle compartment regardless of operation of the air conditioning switch, operation of a temperature adjustment dial for lowering a preset temperature or an air-conditioning turned-ON state.

While the embodiment has been described in connection with an example where the high pressure sensor is used as the compressor-capacity-volume equivalent-value detecting means, for instance, it may be possible to use a means for detecting the pressure of the high pressure refrigerant at any position in the air conditioning cycle between the discharge side of the compressor and the expansion valve and a means for predicting the compressor discharge pressure by calculation.

While the embodiment has been described in connection with an example where the fan motor is controlled in one cool-down control map regardless of the demanded cooling capacity during the cool-down mode as the fan motor control means, the fan motor control may be performed depending on the magnitude of the demanded cooling capacity by shifting the compressor discharge pressure at a lower side or by selecting an optimum map among a plurality of control maps.

While the embodiment has been described in connection with an example where the evaporator-outlet temperature sensor is used as the evaporator-outlet temperature detecting means, in case of an evaporator-outlet temperature sensor being provided, it may be arranged to estimate the evaporator-outlet temperature from the evaporator inlet temperature.

In the embodiment, the fan motor control may be performed depending on the magnitude of the vehicle speed as the fan motor control means such that, during the normal traveling mode, for instance, correction is implemented to alter the inclination of the normal control map based on the magnitude of the vehicle speed or to select the optimum map among a plurality of normal control maps. Also, during the normal traveling mode, the fan motor control may be performed by adding traveling resistance information such as a road surface slope or accelerator-opening-degree information in addition to vehicle speed information.

The entire contents of a Japanese Patent Application No. P2002-89118 with a filing date of Mar. 27, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A vehicle air conditioning apparatus for controlling an air conditioning cycle having a compressor, a fan motor activated by a power source composed of an alternator driven by an engine, and a fan driven by the fan motor for cooling a condenser, the apparatus comprising:

a compressor-volume equivalent-value detector detecting a compressor-volume equivalent-value corresponding to a volume of the compressor;

a fan motor controller configured to control a fan motor load of the fan motor; and a control map setter setting a control map, that determines the fan motor load for the compressor volume detected by the compressor-volume equivalent-value detector, in a way to minimize a total engine load torque formed by a total sum of an engine load torque caused by the compressor and the engine load torque caused by the fan motor, wherein control of the fan motor load by the fan motor controller is dependent on the compressor-volume equivalent-value using the compressor-volume equivalent-value and the control map set by the control map setter.

2. The vehicle air conditioning apparatus of claim 1, further comprising a vehicle statuses detector detecting vehicle statuses, wherein the control map setter measures the maximum efficiency points in dependence on the detected vehicle statuses, respectively, and sets the control map, that determines the fan motor load for the compressor volume, in dependence on measured results of the maximum efficiency points.

3. The vehicle air conditioning apparatus of claim 1, wherein the vehicle status detector includes a demanded cooling capacity predictor predicting a cooling capacity demanded in the air conditioning cycle, and wherein the control map setter sets a cool-down control map on the basis of the maximum efficiency point at which a cooling capacity required in the air conditioning cycle is high and which provides the maximum fuel consumption under a cool-down situation, and wherein the fan motor controller controls the fan motor, using the cool-down control map which is set, during a cool-down mode in which a demanded cooling capacity is predicted to be greater than a given preset value.

4. The vehicle air conditioning apparatus of claim 1, wherein the fan motor controller comprises an evaporator-outlet temperature detector detecting the temperature at a position just behind an outlet of the evaporator, and a target evaporator-outlet temperature setter setting a target temperature at the position just behind the outlet of the evaporator, wherein the demanded cooling capacity predictor predicts a demanded cooling capacity responsive to a value of a differential temperature between an evaporator-outlet temperature detected value and a target evaporator-outlet temperature.

5. The vehicle air conditioning apparatus of claim 1, wherein the compressor comprises an externally controlled type compressor which is driven by an engine and whose compressor volume is externally and variably controlled, the externally controlled type compressor being controlled by a compressor controller which controls a target compressor volume that provides a power saving for a cooling capacity demanded in an air conditioning cycle.

6. The vehicle air conditioning apparatus of claim 1, wherein the fan motor load is determined by the fan motor controller, and the fan motor controller includes slow-start controller that, when a shift occurs from a current fan motor load to the fan motor load which is determined, varies a-fan the fan motor load while limiting an amount of load variation in terms of a unit time.

7. The vehicle air conditioning apparatus of claim 6, wherein the slow-start controller has a first slope along which a current fan motor load shifts from zero to a determined fan motor load, and a second slope along which the current fan motor load shifts from a status at a given value to the determined fan motor load, the second slope being higher than the first slope.

* * * * *